United States Patent
Wakamiya

(10) Patent No.: US 11,156,702 B2
(45) Date of Patent: Oct. 26, 2021

(54) SENSOR ABNORMALITY DETERMINING APPARATUS

(71) Applicant: TOYOTA JIDOSHA KABUSHIKI KAISHA, Toyota (JP)

(72) Inventor: Hideyuki Wakamiya, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 251 days.

(21) Appl. No.: 16/145,352

(22) Filed: Sep. 28, 2018

(65) Prior Publication Data

US 2019/0101629 A1  Apr. 4, 2019

(30) Foreign Application Priority Data

Oct. 2, 2017 (JP) .............................. JP2017-192869

(51) Int. Cl.
*G01S 7/497* (2006.01)
*G01S 7/40* (2006.01)
*G01S 13/931* (2020.01)

(52) U.S. Cl.
CPC ............ *G01S 7/497* (2013.01); *G01S 7/40* (2013.01); *G01S 13/931* (2013.01); *G01S 7/4039* (2021.05); *G01S 7/4043* (2021.05); *G01S 7/4047* (2021.05); *G01S 2007/4977* (2013.01)

(58) Field of Classification Search
None
See application file for complete search history.

(56) References Cited

U.S. PATENT DOCUMENTS

| 7,693,647 | B2* | 4/2010 | Suzuki | G01F 1/696 |
| | | | | 701/113 |
| 7,783,400 | B1* | 8/2010 | Zimler | B60S 1/0866 |
| | | | | 701/36 |
| 9,221,548 | B1* | 12/2015 | Sishtla | F02C 9/00 |
| 9,346,349 | B2* | 5/2016 | Kobayashi | B60K 11/085 |
| 2015/0232087 | A1* | 8/2015 | Masuda | B60K 11/02 |
| | | | | 701/22 |

(Continued)

FOREIGN PATENT DOCUMENTS

| JP | 62077704 A | 4/1987 |
| JP | 08-029535 A | 2/1996 |
| JP | 2003521679 A | 7/2003 |

(Continued)

OTHER PUBLICATIONS

Espacenet machine translation, Poguntke et al., "Sensoranordnung," DE19956089A1, Jun. 21, 2001 (Year: 2001).*

*Primary Examiner* — Eman A Alkafawi
*Assistant Examiner* — Denise R Karavias
(74) *Attorney, Agent, or Firm* — Sughrue Mion, PLLC

(57) ABSTRACT

A sensor abnormality determining apparatus is configured to determine an abnormality in a sensor apparatus, which is used to recognize a surrounding environment of a vehicle and which includes a heater for heating a cover. The sensor abnormality determining apparatus is provided with: a detector configured to detect a temperature of the heater; an estimator configured to estimate a temperature of the heater on the basis of a speed of the vehicle and an outside air temperature; and a determinator configured to determine an abnormality in the sensor apparatus on the basis of the detected temperature and the estimated temperature.

2 Claims, 2 Drawing Sheets

(56) References Cited

U.S. PATENT DOCUMENTS

2016/0176528 A1    6/2016  Meis et al.
2017/0238363 A1*  8/2017  Oskwarek .............. F28D 15/00
                                                          219/491

FOREIGN PATENT DOCUMENTS

JP        2012116276 A    6/2012
JP        2016113148 A    6/2016

* cited by examiner

FIG. 1
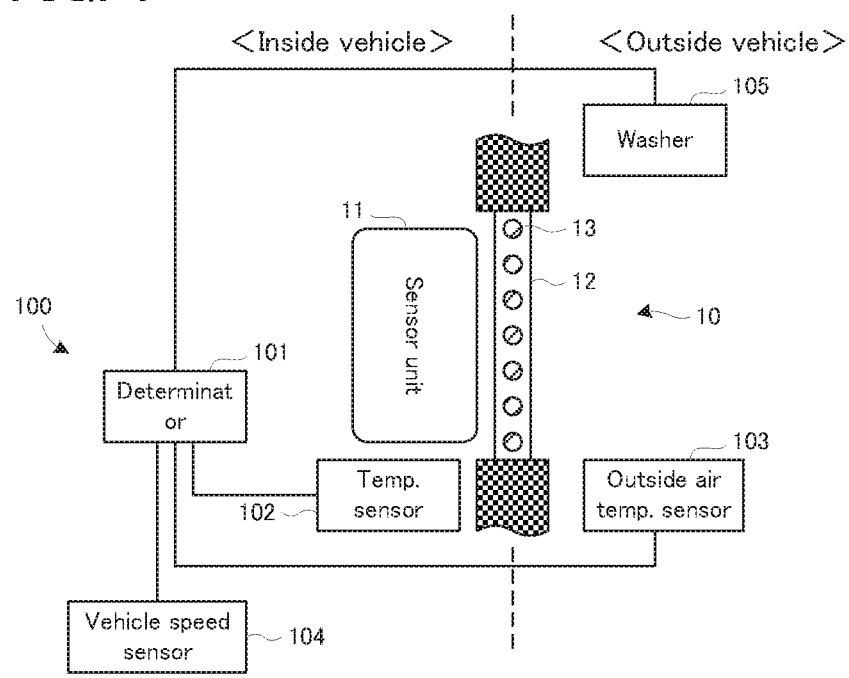
FIG. 2A   FIG. 2B   FIG. 2C   FIG. 2D
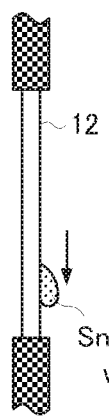
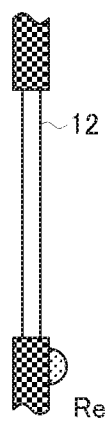
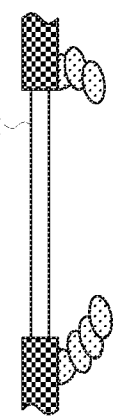
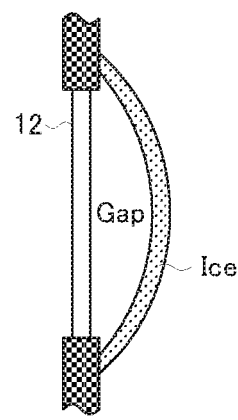

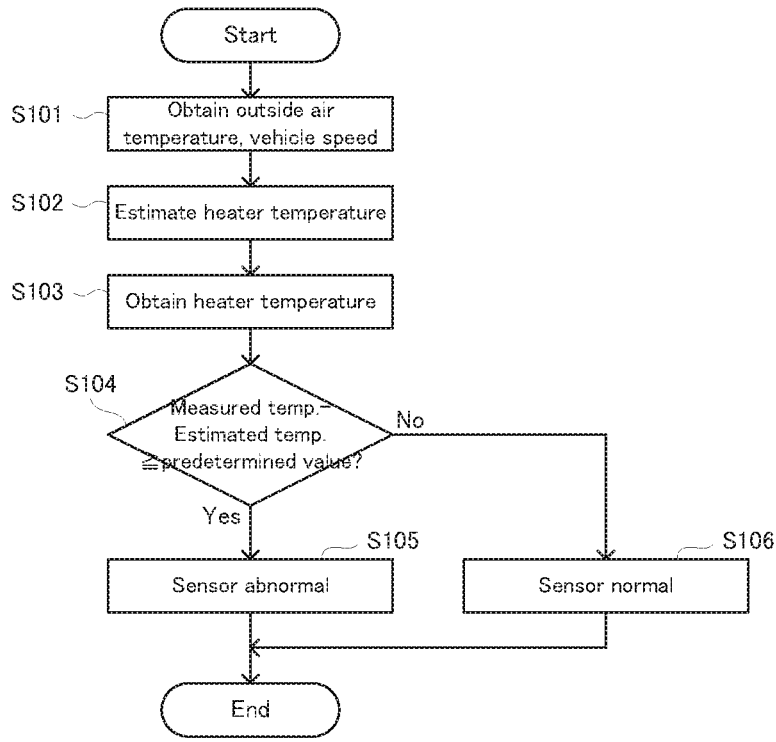

SENSOR ABNORMALITY DETERMINING APPARATUS

CROSS-REFERENCE TO RELATED APPLICATIONS

This application is based upon and claims the benefit of priority of the prior Japanese Patent Application No. 2017-192869, filed on Oct. 2, 2017, the entire contents of which are incorporated herein by reference.

BACKGROUND

1. Technical Field

Embodiments of the present disclosure relate to a sensor abnormality determining apparatus, and particularly relate to a sensor abnormality determining apparatus configured to determine an abnormality in a sensor, which is mounted on a vehicle.

2. Description of the Related Art

An example of the sensor targeted by this type of apparatus is, for example, an apparatus that is provided with a heat wire heater and an ultrasonic vibrator on a cover glass for covering front faces of a light emitter and a light receiver of a laser radar, and that is configured to remove snow and frost, which are attached to the cover glass, by operating the heat wire heater and the ultrasonic vibrator, which is proposed in Japanese Patent Application Laid Open No. Hei08-029535 (Patent Literature 1).

In some cases, snow that is attached to the cover glass and is melted by the heat wire heater may be refrozen near the cover glass and in a part to which no heat is transferred from the heat wire heater. At this time, refrozen ice may grow depending on the weather or the like, and may cover the cover glass without touching the cover glass. The refrozen ice cannot be removed by the heat wire heater or the like because it is not in touch with the cover glass.

SUMMARY

In view of the aforementioned problems, it is therefore an object of embodiments of the present disclosure to provide a sensor abnormality determining apparatus configured to determine an abnormality in a sensor that is caused by a cover glass.

The above object of embodiments of the present disclosure can be achieved by a sensor abnormality determining apparatus configured to determine an abnormality in a sensor apparatus, which is used to recognize a surrounding environment of a vehicle and which includes a heater for heating a cover, the sensor abnormality determining apparatus provided with: a detector configured to detect a temperature of the heater; an estimator configured to estimate a temperature of the heater on the basis of a speed of the vehicle and an outside air temperature; and a determinator configured to determine an abnormality in the sensor apparatus on the basis of the detected temperature and the estimated temperature.

BRIEF DESCRIPTION OF THE DRAWINGS

FIG. 1 is a block diagram illustrating a configuration of a sensor abnormality determining apparatus according to an embodiment;

FIG. 2A is a conceptual diagram illustrating a problem due to refreezing of snowmelt water;

FIG. 2B is a conceptual diagram illustrating the problem due to the refreezing of snowmelt water;

FIG. 2C is a conceptual diagram illustrating the problem due to the refreezing of snowmelt water;

FIG. 2D is a conceptual diagram illustrating the problem due to the refreezing of snowmelt water;

FIG. 3 is a flowchart illustrating an abnormality determination process according to the embodiment; and FIG. 4 is a diagram illustrating an example of a table for defining a relation among a vehicle speed, an outside air temperature, and an estimated temperature of a heater.

DETAILED DESCRIPTION OF THE EMBODIMENTS

A sensor abnormality determining apparatus according to an embodiment will be explained with reference to FIG. 1 to FIG. 4.

(Configuration)

A configuration of the sensor abnormality determining apparatus according to the embodiment will be explained with reference to FIG. 1. FIG. 1 is a block diagram illustrating the configuration of the sensor abnormality determining apparatus according to the embodiment.

In FIG. 1, an example of a sensor apparatus 10 targeted by a sensor abnormality determining apparatus 100 is a sensor used to recognize a surrounding environment of a vehicle, such as, for example, a laser radar and a millimeter wave radar. The sensor apparatus 10 is provided with a sensor unit 11 and a cover glass 12, which is equipped with a heat wire heater 13. The sensor unit 11 may be mounted inside a vehicle (e.g., in an engine room, etc.). The cover glass 12 may protect the sensor unit 11 from rain, dust, and the like.

The sensor abnormality determining apparatus 100 is provided with a determinator 101, a temperature sensor apparatus 102, an outside air temperature sensor apparatus 103, a vehicle speed sensor apparatus 104, and a washer 105. The temperature sensor apparatus 102 is configured to detect a temperature of the heat wire heater 13. The washer 105 is configured to jet or spray washer liquid on the cover glass 12. The outside air temperature sensor apparatus 103 and the vehicle speed sensor apparatus 104 may not be provided only for the sensor abnormality determining apparatus 100, but may be shared, for example, by another apparatus mounted on the vehicle (not illustrated).

(Problems and Principle of Abnormality Determination)

Next, a problem associated with the sensor apparatus 10 will be explained with reference to FIG. 2A to FIG. 2D. FIG. 2A to FIG. 2D are conceptual diagrams illustrating the problem due to refreezing of snowmelt water.

As illustrated in FIG. 2A, snow attached to the cover glass 12 is melted by heat of the heat wire heater 13 and flows down along a surface of the cover glass 12. If an outside air temperature is relatively low at this time, as illustrated in FIG. 2B, snowmelt water is refrozen at a position that is out of the cover glass 12. If it continues to snow, as illustrated in FIG. 2C, snow is attached to refrozen ice, and the ice grows. In some cases, the ice grows in such a manner that snow is attached to the ice that is formed by freezing of water that is attached to an upper part of the cover glass 12. If the ice continues to grow, in the end, as illustrated in FIG. 2D, an ice film that covers the cover glass 12 is formed.

In a state illustrated in FIG. 2D, the ice film causes a reduction in performance of the sensor apparatus 10. As illustrated in FIG. 2D, there is a gap between the ice film and the cover glass 12, and it is thus extremely hard to melt the ice film by using the heat of the heat wire heater 13.

By the way, if there is no ice film, a running wind caused by the running of the vehicle blows against the cover glass 12. In other words, the cover glass 12 (and moreover, the heat wire heater 13) is cooled by the running wind. To put it in the other way, if there is the ice film, the cover glass 12 is not cooled (or is hardly cooled) by the running wind.

Paying attention to this point, the present inventor has invented an idea of determining whether or not there is the ice film (i.e., an abnormality in the sensor apparatus 10) by comparing the temperature of the heat wire heater 13 detected by the temperature sensor apparatus 102 with the temperature of the heat wire heater 13 estimated from the outside air temperature and a vehicle speed (i.e., strength of the running wind).

(Abnormality Determination Process)

Next, an abnormality determination process performed by the determinator 101 of the sensor abnormality determining apparatus 100 will be explained with reference to a flowchart in FIG. 3.

In FIG. 3, firstly, the determinator 101 obtains the outside air temperature and the vehicle speed respectively from the outside air temperature sensor apparatus 103 and the vehicle speed sensor 104 (step S101). The determinator 101 then estimates the temperature of the heat wire heater 13 on the basis of the obtained outside air temperature and the obtained vehicle speed (step S102).

Here, to estimate the temperature of the heat wire heater 13, for example, a table for defining a relation among the vehicle speed, the outside air temperature, and the estimation temperature of the heater, which is illustrated in FIG. 4, may be used. Such a configuration makes it possible to reduce a processing load of the determinator 101. Such a table may be established, for example, by detecting the temperature of the heat wire heater 13 by using the temperature sensor apparatus 102 while changing each of the outside air temperature and the vehicle speed by experiments. For a condition that is hardly obtained by experiments, i.e., a combination of the outside air temperature and the vehicle speed, interpolation may be performed by calculation from a value in another condition that is obtained by experiments. The determinator 101 may estimate the temperature of the heat wire heater 13 from the outside air temperature and the vehicle speed by using a predetermined arithmetic expression instead of the table.

In parallel with the step S101 and the step S102, the determinator 101 may obtain the temperature of the heat wire heater 13 from an output of the temperature sensor apparatus 102. The determinator 101 then determines whether or not a difference between the temperature obtained in the step S103 (hereinafter referred to a "measured temperature") and the temperature obtained in the step S102 (hereinafter referred to an "estimated temperature") is greater than or equal to a predetermined value (step S104).

In the determination in the step S104, if it is determined that the difference between the measured temperature and the estimated temperature is greater than or equal to the predetermined value (the step S104: Yes), the determinator 101 determines that there is an abnormality in the sensor apparatus 10, i.e., that the cover glass 12 is relatively likely covered with the ice film (step S105). On the other hand, if it is determined that the difference between the measured temperature and the estimated temperature is less than the predetermined value (the step S104: No), the determinator 101 determines that there is no abnormality in the sensor apparatus 10 (step S106).

If the cover glass 12 is covered with the ice film, the cover glass 12 is not cooled down, as described above, and thus, the measured temperature and the estimated temperature are separated from each other. Specifically, the estimated temperature is lower than the measured temperature. The output of each of the temperature sensor apparatus 102, the outside air temperature sensor apparatus 103, and the vehicle speed sensor apparatus 104 may include an error. In the step S104, however, it is determined whether or not the difference between the measured temperature and the estimated temperature is greater than or equal to the predetermined value so as to determine that there is the abnormality in the sensor apparatus 10 only when the measured temperature and the estimated temperature are separated beyond an error range. Therefore, the "predetermined value" may be set on the basis of the error of each sensor.

After the step S105 or the step S106, the determinator 101 may start the abnormality determination process illustrated in FIG. 3 again after a lapse of a predetermined period (e.g., several milliseconds to several ten milliseconds). In other words, the abnormality determination process illustrated in FIG. 3 may be repeated in a cycle corresponding to the predetermined period.

The determinator 101 may, for example, announce the abnormality in the sensor apparatus 10 or operate the washer 105 to remove the ice film by using washer liquid if it is determined that there is the abnormality in the sensor apparatus 10.

In the step S104, instead of the determination of "whether or not the difference between the measured temperature and the estimated temperature is greater than or equal to the predetermined value", for example, it may be determined "whether or not the measured temperature is greater than or equal to a sum of the estimated temperature and a predetermined value" (i.e., "measured temperature≥estimated temperature+predetermined value?").

(Technical Effect)

According to the sensor abnormality determining apparatus 100, it is possible to determine the abnormality in the sensor apparatus 10 caused by the cover glass 12 of the sensor apparatus 10 being covered with the ice film, which is hardly melted by the heat of the heat wire heater 13.

Modified Example

In the aforementioned embodiment, it is explained that the cover glass 12 of the sensor apparatus 10 is covered with the ice film. The sensor abnormality determining apparatus 100 can be also applied to determine the abnormality in the sensor apparatus 10 caused by dirt and fallen leaves or the like being attached to most of the cover glass 12. In other words, the running wind hardly blows against the cover glass 12 even when dirt and fallen leaves or the like are attached to most of the cover glass 12, and thus, the measured temperature and the estimated temperature are separated from each other. Therefore, the abnormality determination process described above allows the determination of the abnormality in the sensor apparatus 10 caused by dirt and fallen leaves or the like being attached to most of the cover glass 12.

Various aspects of embodiments of the present disclosure derived from the embodiment and the modified example explained above will be explained hereinafter.

A sensor abnormality determining apparatus according to one aspect of the present disclosure is a sensor abnormality determining apparatus configured to determine an abnormality in a sensor apparatus, which is used to recognize a surrounding environment of a vehicle and which includes a heater for heating a cover, the sensor abnormality determining apparatus provided with: a detector configured to detect a temperature of the heater; an estimator configured to estimate a temperature of the heater on the basis of a speed of the vehicle and an outside air temperature; and a determinator configured to determine an abnormality in the sensor apparatus on the basis of the detected temperature and the estimated temperature.

In the aforementioned embodiment, the "sensor apparatus 10" corresponds to an example of the sensor apparatus, the "cover glass 12" corresponds to an example of the cover, the "heat wire heater 13" corresponds to an example of the heater, the "temperature sensor apparatus 102" corresponds to an example of the detector, and the "determinator 101" corresponds to an example of the estimator and the determinator.

If the cover of the sensor apparatus is covered with the ice film, which is hardly melted by the heat of the hater, or if dirt or the like is attached to the cover, the performance of the sensor apparatus is reduced, i.e., there is the abnormality in the sensor apparatus. In those cases, the running wind does not blow or hardly blows against the cover. Thus, the temperature of the heater detected by the detector is separated from the temperature of the heater estimated on the basis of the speed of the vehicle and the outside air temperature. It is thus possible to determine the abnormality in the sensor apparatus on the basis of the detected temperature of the heater and the estimated temperature of the heater. Therefore, according to the sensor abnormality determining apparatus, it is possible to determine the abnormality in the sensor apparatus caused by the cover.

In one aspect of the sensor abnormality determining apparatus described above, the determinator is configured to determine that there is an abnormality in the sensor apparatus on condition that the detected temperature is higher than the estimated temperature, by a value that is greater than or equal to a predetermined value. According to this aspect, it is possible to prevent erroneous determination of the abnormality in the sensor apparatus, which is extremely useful in practice. The "predetermined value" may be set, for example, on the basis of a temperature detection error, a temperature estimation error, or the like.

In another aspect of the sensor abnormality determining apparatus described above, the abnormality in the sensor apparatus is an abnormality caused by refreezing of snowmelt water. The "abnormality caused by the refreezing of the snowmelt water" means that the cover of the sensor apparatus is covered with the ice film, which is formed due to the refreezing of the snowmelt water, and that the performance of the sensor apparatus is reduced. As described above, according to the sensor abnormality determining apparatus, it is possible to determine the abnormality caused by the freezing of the snowmelt water.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A sensor abnormality determining apparatus configured to determine an abnormality in a sensor apparatus, which is used to recognize a surrounding environment of a vehicle and which includes a heater for heating a cover covering an emitter where light or radio waves are emitted, the sensor abnormality determining apparatus comprising:
   a detector configured to detect a temperature of the heater;
   an estimator configured to estimate a temperature of the heater on the basis of a speed of the vehicle and an outside air temperature; and
   a determinator configured to determine the abnormality in the sensor apparatus on the basis of the detected temperature of the heater and the estimated temperature of the heater,
   wherein the abnormality in the sensor apparatus means that at least part of the heater is covered with ice.

2. The sensor abnormality determining apparatus according to claim 1, wherein the determinator is configured to determine that there is the abnormality in the sensor apparatus on condition that the detected temperature is higher than the estimated temperature, by a value that is greater than or equal to a predetermined value.

* * * * *